(12) United States Patent
Hammarth et al.

(10) Patent No.: US 7,216,816 B2
(45) Date of Patent: May 15, 2007

(54) AIRLESS APPLICATION SYSTEM AND METHOD OF SPRAYING

(75) Inventors: Mark Hammarth, Coram, NY (US); Stephen J. Lacivita, Foxboro, MA (US); Kevin J. May, Ball Ground, GA (US); Christopher Molina, Yorba Linda, CA (US); John S. Piwnica, Jr., Loudonville, NY (US); Paul A. Raymond, Fords, NJ (US); Johnathan C. Waters, W. Wareham, MA (US); Timothy Oberg, Plainfield, IL (US); John Ekpenyong, Chicago, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 11/249,137

(22) Filed: Oct. 12, 2005
(Under 37 CFR 1.47)

(65) Prior Publication Data
US 2006/0254222 A1 Nov. 16, 2006

Related U.S. Application Data

(62) Division of application No. 10/225,874, filed on Aug. 22, 2002.

(51) Int. Cl.
| B05B 15/02 | (2006.01) |
| B05B 9/01 | (2006.01) |
| B05B 9/04 | (2006.01) |
| B05B 7/02 | (2006.01) |
| B05B 1/30 | (2006.01) |

(52) U.S. Cl. .................. 239/106; 239/104; 239/112; 239/526; 239/525; 239/305; 239/373; 239/579

(58) Field of Classification Search ............... 239/106, 239/104, 112, 526, 525, 305, 373, 579, 107, 239/108, 115, 116, 118, 303, 304, 308, 323, 239/375, 527, 528, 574
See application file for complete search history.

(56) References Cited

U.S. PATENT DOCUMENTS

| 2,880,940 | A | | 4/1959 | Briggs |
| 3,240,399 | A | | 3/1966 | Frandeen |
| 3,786,990 | A | * | 1/1974 | Hagfors ...................... 239/112 |
| 4,175,702 | A | * | 11/1979 | Hetherington et al. ....... 239/113 |
| 4,227,650 | A | | 10/1980 | McKinney |
| 5,398,852 | A | | 3/1995 | Lacy |
| 5,435,488 | A | * | 7/1995 | Abiko ......................... 239/110 |
| 5,526,957 | A | | 6/1996 | Brown et al. |
| 5,829,681 | A | | 11/1998 | Hamel et al. |
| 5,887,761 | A | | 3/1999 | Foster et al. |
| 5,899,362 | A | | 5/1999 | Moran |
| 6,015,068 | A | | 1/2000 | Osgar et al. |
| 6,488,991 | B1 | | 12/2002 | Hunter et al. |
| 6,533,187 | B2 | * | 3/2003 | May ............................. 239/1 |
| 2004/0050962 | A1 | * | 3/2004 | Hammarth et al. ......... 239/302 |

* cited by examiner

Primary Examiner—Kevin Shaver
Assistant Examiner—Darren Gorman
(74) Attorney, Agent, or Firm—Dinsmore & Shohl LLP

(57) ABSTRACT

An airless application system. The system includes a primary product container, a secondary product container, and a sprayer in fluid communication with the primary product container and the secondary product container.

19 Claims, 13 Drawing Sheets

AIRLESS APPLICATION SYSTEM AND METHOD OF SPRAYING

CROSS REFERENCE TO RELATED APPLICATIONS

This application is a divisional of U.S. application Ser. No. 10/225,874 filed Aug. 22, 2002, entitled "Aerosol Composition".

BACKGROUND OF THE INVENTION

The present invention relates generally to sprayer assemblies, and more particularly to an airless application system with a tip cleaning function and a product container, and to a method of spraying using such a system.

This invention also relates to an aerosol composition which reduces adhesive residue build up on surfaces. The aerosol composition includes a base material selected from a petroleum based oil or a silicone fluid, which coats and protects the surface, a slow evaporating solvent which acts as a protective barrier between the surface and adhesive material, and a propellant.

Some aerosol products use a solvent to create a solution or suspension that includes the liquefied propellant. As environmental concerns have increased, aerosol products using water have become desirable. However, water does not mix easily with many propellant agents. In addition, film producing agents, such as adhesives, are designed with close tolerances with respect to miscibility and resistance to shear.

Adhesives are commonly used in industrial and consumer applications. Application systems to apply adhesive materials include dispensers such as adhesive spray guns. The adhesive is housed in a compartment within the spray gun or applicator and delivered to an aperture from which it is ejected onto a desired surface.

Most adhesives are composed of synthetic polymers and are designed to create a film which is tacky and resistant to contaminants that may degrade the tacky characteristic. By design, an adhesive film must not soften and release its hold on a substrate. The same properties which are desirable in the adhesive are problematic in delivering the adhesive from an applicator. Adhesive residue can build-up on the surfaces of the dispenser, resulting in clogging. The adhesive residue must then be removed by the user of the dispenser, which is time consuming and disruptive in the adhesive application process.

There is, therefore, need for an aerosol which reduces adhesive build-up on the surfaces of the dispenser. There is also a need for an aerosol composition which reduces adhesive build-up on surfaces other surfaces as well.

Most water-based adhesives are applied using air-assisted equipment. The application gun is designed with tandem valves so that both the air and product valves are open at the same time. The primary product is supplied to the gun from either a low-pressure container or through a venturi siphon and is atomized by a high-pressure stream of air. The compressed air helps keep the tip clean. However, air-assisted applicators are limited to locations where compressed air is available. In addition, they are prone to maintenance problems and the equipment can be difficult to adjust.

An airless solvent-based application system incorporates a needle valve to control the flow of the product to a tip designed to impart a particular pattern to the product as it exits the tip. In order to achieve this pattern, there is a space between the valve and the orifice. The space fills and swirls the product to obtain the spray pattern. When propellant is dissolved in the formula, the expansion in the tip space helps to clear the tip. However, for a simple-pressure pot system, there is no driving force to clear the tip when the valve is closed.

The use of water-based products in aerosol packages (that is, self-contained, pre-pressurized containers) is known. Formulations which require complete segregation from the propellants (such as "bag-in-can") are also known. However, this technology has apparently not been used successfully for an adhesive and/or in a package larger than one liter.

Therefore, there is a need for an airless application system with a sprayer which can clear the sprayer tip after each application.

SUMMARY OF THE INVENTION

The present invention meets the need for an aerosol composition which reduces adhesive build-up by providing an aerosol composition including a solvent having an evaporation rate of no more than about 2, a propellant, and a base material selected from a petroleum based oil or a silicone fluid. As used herein, the term "evaporation rate" is the ratio of the rate of evaporation of a given solvent to the rate of evaporation of n-butyl acetate.

The solvent is generally present in an amount of not more than about 60% by weight of the aerosol composition, typically about 25% to about 50% by weight of the aerosol composition. Suitable solvents include, but are not limited to, toluene, xylene, methyl isobutyl ketone, mineral spirits, naphtha, cycloparaffins, synthetic isoparaffnic hydrocarbons, parachlorobenzotrifluoride, or mixtures thereof.

The base material is generally present in an amount of about 5% to about 25% by weight of the aerosol composition, typically about 5% to about 15% by weight of the aerosol composition. Suitable petroleum based oils include, but are not limited to, paraffinic oils, naphthenic oils, oils having an aromatic content of 11 to 38 clay-gel weight percent and an aniline cloud point of about 185° F. to about 221° F., or mixtures thereof. Suitable silicone fluids include, but are not limited to, cyclic, branched, or linear siloxanes, including methylated siloxanes, such as completely methylated siloxanes.

The propellant is generally present in an amount of about 25% to about 60% by weight of the aerosol composition, typically about 40% to about 60% by weight of the aerosol composition. Suitable propellants include, but are not limited to, fluorocarbon propellants, particularly fluorocarbon propellants having a Volatile Organic Content VOC exempt status.

The present invention meets the need for an airless application system with a sprayer which can clear the sprayer tip after each application by providing an airless application system including a primary product container, a secondary product container, and a sprayer in fluid communication with the primary product container and the secondary product container. The sprayer includes an inlet body; a check valve body; an annular channel between the inlet body and the check valve body; a sprayer tip; a primary product chamber for holding a primary product to be dispensed through the sprayer tip, the primary product chamber in selective fluid communication with the sprayer tip, the primary product chamber having an outlet; a manual control which travels through a range, the range including a first position and a second position; a valve assembly responsive to the manual control, wherein when the manual control is in the first position, the primary product chamber outlet is closed, and wherein when the manual control is in the second position, the primary product outlet is open; a secondary product valve in selective fluid communication with the sprayer tip, the secondary product valve located in the inlet body; a first channel between the secondary product valve and the annular channel; and a second channel between the annular channel and the spray tip.

Another aspect of the invention is a method of airless spraying of a primary product and a secondary product. The method includes providing a sprayer tip; providing a primary product chamber having an outlet, the primary product chamber in selective fluid communication with the sprayer tip; providing a secondary product valve in selective fluid communication with the sprayer tip, and the secondary product valve in selective fluid communication with a secondary product container outlet valve; providing a primary product to the primary product chamber; opening the primary product chamber outlet and thereby dispensing the primary product, the primary product chamber outlet being opened while the secondary product chamber outlet is closed; closing the primary product outlet; placing the secondary product container outlet valve in contact with the secondary product valve, opening the secondary product valve and thereby dispensing the secondary product, the secondary product valve being opened after the primary product chamber outlet is closed; and closing the secondary product valve.

DETAILED DESCRIPTION OF THE INVENTION

Figure 1:
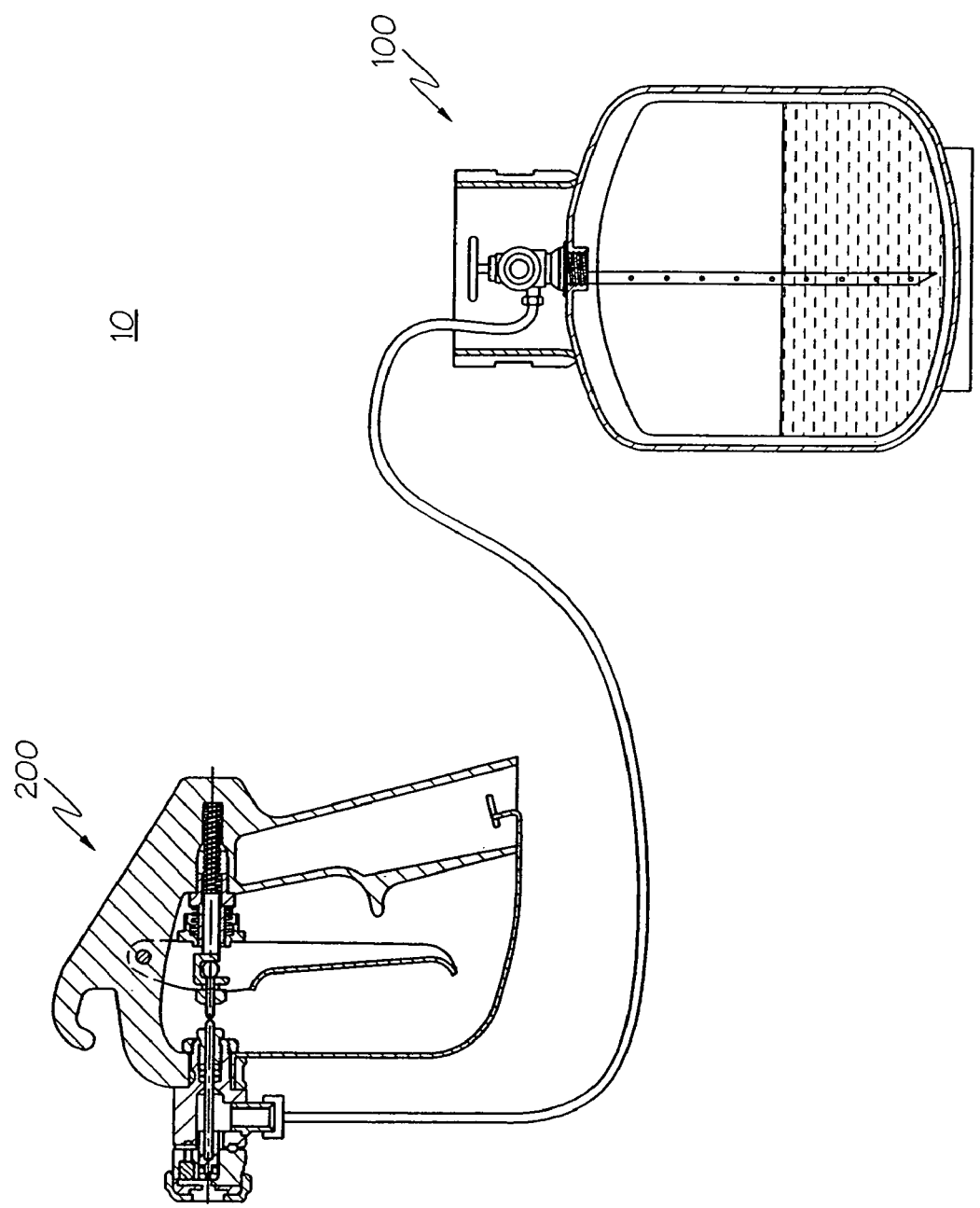
FIG. 1 is a schematic of one embodiment of the airless application system of the present invention.

The aerosol composition of the present invention comprises a solvent having an evaporation rate no more than about 2, a propellant, and a base material selected from a petroleum based oil or a silicone fluid.

The solvent has an evaporation rate of no more than about 2. Suitable solvents include, but are not limited to toluene, xylene, methyl isobutyl ketone, mineral spirits, naphtha, cycloparaffins, or mixtures thereof. Typical solvents include cycloparaffins, such as CYPAR® 7 and CYPAR® 9, available from Shell Chemical Co., which are not hazardous air pollutants (HAP). The solvent is generally present in an amount of not more than about 60% by weight of the aerosol composition, typically in the range of about 25% to about 50% by weight of the aerosol composition.

Suitable petroleum based oils include, but are not limited to, paraffinic and naphthenic oils, oils having an aromatic content of 11 to 38 clay-gel weight percent and an aniline cloud point of 185° F. to 221° F., and mixtures thereof. Naphthenic oils, including, but not limited to, Shellflex® 311, 371, 3271, 3311 and 3371, available from Shell Chemical Co., and Flexcon® 650, 660, 680 and 766, available from Exxon Mobil Corp., may be used. Paraffinic oils, including, but not limited to, Shellflex® 2210, and 2310, and Flexon® 845, available from Shell Chemical Co. and Exxon Mobil Corp., respectively, may also be used. Suitable silicone fluids include butane not limited to, cyclic, branched or linear siloxanes, including methylated siloxanes, such as completely methylated siloxanes. Completely methylated siloxanes have a VOC exempt status. Silicone fluids including, but not limited to, the SF-96® and Viscasil® series available from GE Silicones, may be used. The base material is generally present in an amount of about 5 to about 25% by weight, typically about 5% to about 15% by weight of the aerosol composition.

The aerosol composition also includes a propellant. Suitable propellants include, but are not limited to, fluorocarbon propellants having a VOC exempt status. Examples of suitable propellants include Fluorocarbon 134 and 152A available from E. I. DuPont de Nemours and Company. The propellant is generally present in an amount of about 25% to about 60% by weight of the aerosol composition, typically about 40% to about 60% by weight of the aerosol composition.

The aerosol composition of the invention is particularly suitable for use with respect to water-based adhesives dispersed from an adhesive spray gun. The propellant component of the aerosol composition provides the pressure needed to expel latent adhesive from behind the tip of the spray gun, which adhesive has the potential to clog the gun if allowed to dry. The slow evaporating solvent component of the aerosol composition acts as a hydrophobic barrier, which aids in keeping the tip clean by preventing any latent adhesive from wetting out the area behind the spray tip. The slow evaporation rate of the solvent will also prolong the drying rate of adhesive left behind after the aerosol composition has been released. As the solvent evaporates, the base material of the aerosol composition is left behind and coats the tip surfaces. The base material will not only further retard the adhesive drying rate, but it will also prevent latent adhesive from sticking to the tip surfaces. Moreover, since the aerosol composition is hydrophobic, it is not miscible with the water-based adhesive and will not coagulate with it.

This can be important because many water-based adhesives have limited stability with respect to various chemicals at low concentrations.

Figure 12:
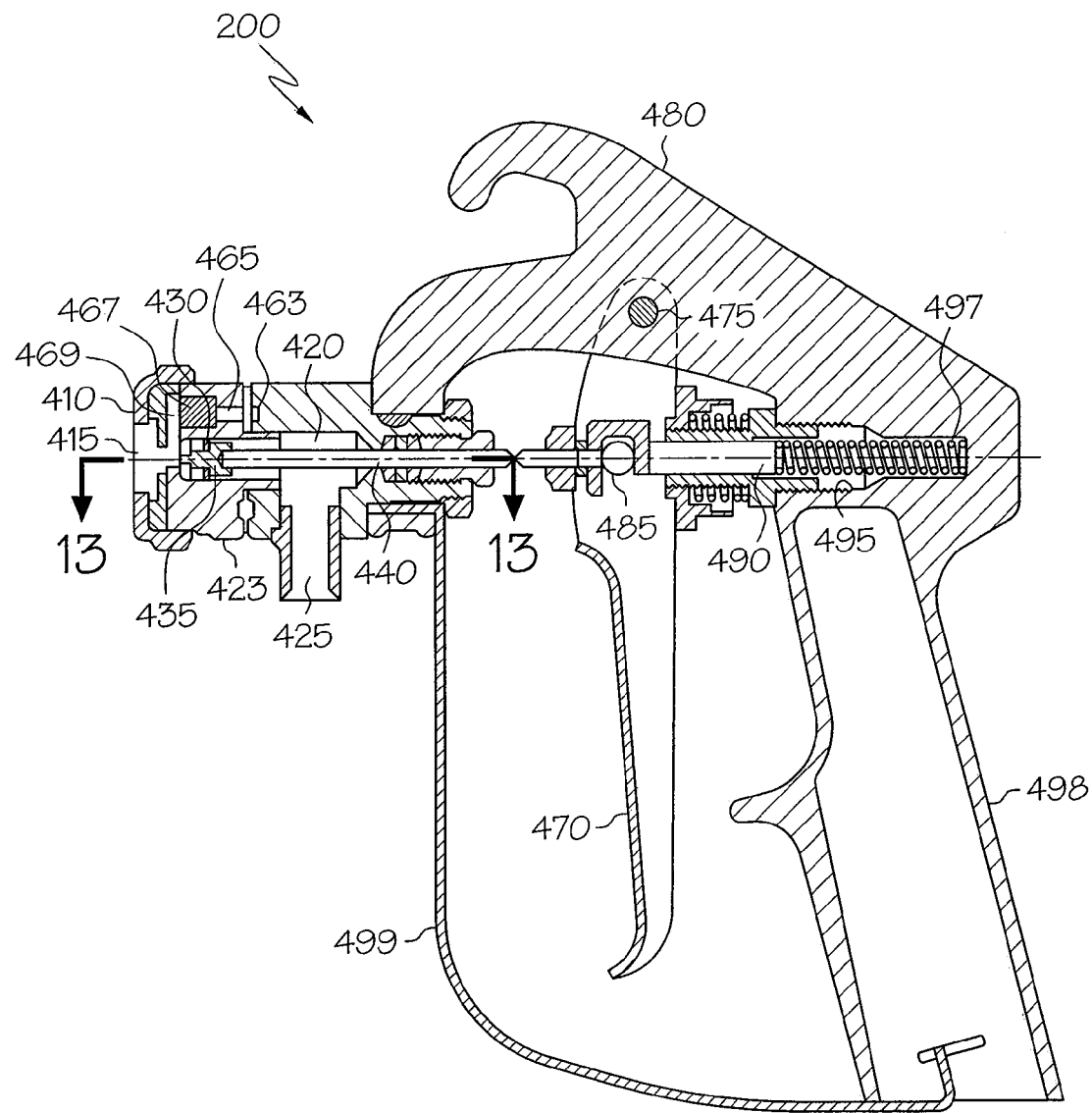
FIG. 12 is a cross-sectional side view, of one embodiment of a spray gun of the present invention, shown at rest with the trigger not depressed.
Figure 13:
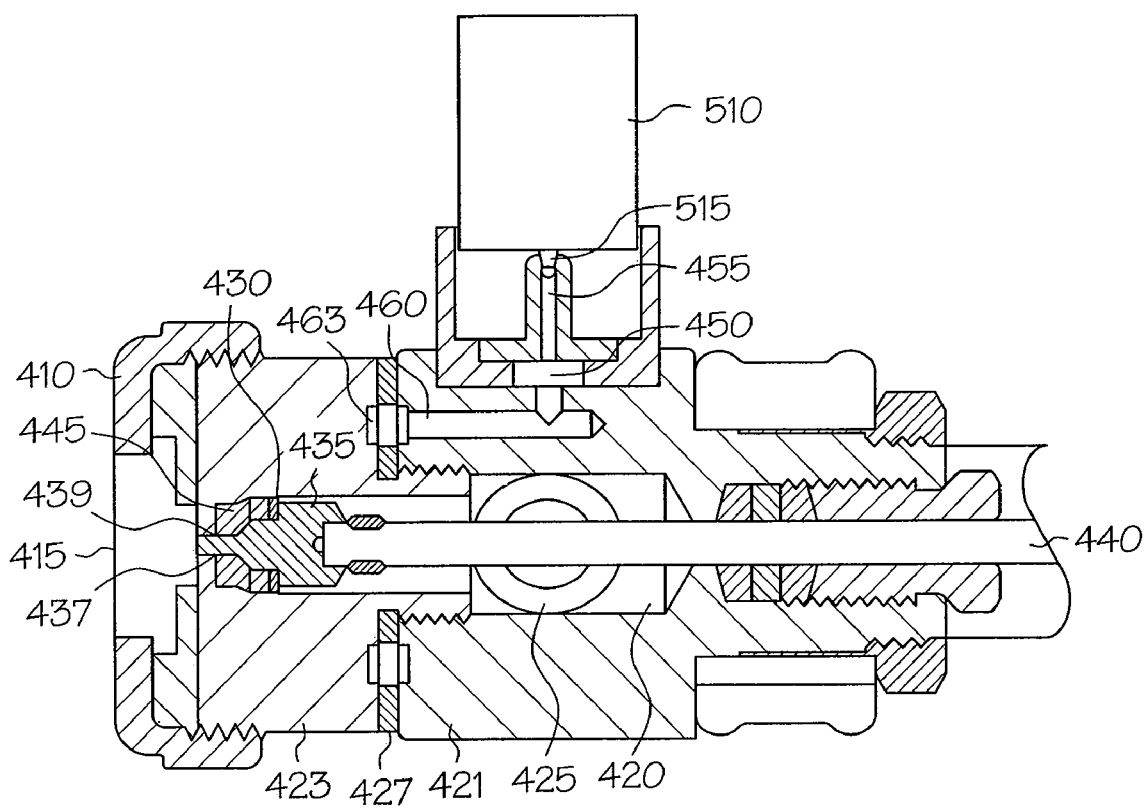
FIG. 13 is a cross-sectional top view of the valve assembly of FIG. 12 taken along the line 13—13.

FIGS. 12 and 13 show one example of a spray gun in which the aerosol composition of the present invention could be used. Sprayer 200 is disclosed more fully in application Ser. No. 10/643,107 (ITW 0003 PA), filed Aug. 18, 2003, now U.S. Pat. No. 6,905,084 (which claimed the benefit of Ser. No. 60/453,691, filed Aug. 22, 2002), and which is hereby incorporated by reference. Sprayer 200 includes sprayer tip 410 with aperture 415 therethrough for spraying or dispensing adhesive 400 and aerosol composition 500. The sprayer 200 further includes adhesive chamber 420. Adhesive chamber 420 receives the adhesive 400 from adhesive inlet 425. Adhesive inlet 425 would be connected to an adhesive container. Adhesive chamber outlet 430 is selectively opened and closed by slider 435 and shaft 440. Slider 435 includes needle 437. Shaft 440 is attached to slider 435, and slider 435 reciprocates within adhesive chamber 420. When shaft 440 is in the forward position shown in FIG. 12, needle 437 is inserted into opening 439 and slider 435 seats against seat 445, closing adhesive chamber outlet 430. Adhesive 400 is blocked from flowing and is not dispensed from sprayer tip 410. When the reciprocation of slider 435 opens adhesive chamber outlet 430, slider 435 is withdrawn from seat 445 and needle 437 is withdrawn from opening 439. Adhesive 400 flows around slider 435 and needle 439 and is dispensed from sprayer tip 410.

Aerosol composition 500 is introduced through aerosol composition chamber outlet 450. Aerosol composition chamber outlet 450 is selectively opened and closed by needle valve 455. When needle valve 455 is closed as shown in FIG. 13, aerosol composition 500 cannot flow through aerosol composition chamber outlet 450. When needle valve 455 is opened by inserting it into a valve on the top of an aerosol can (not shown) of aerosol composition, aerosol composition 500 flows through needle valve 455, channel 460, and into annular channel 463. Aerosol composition 500 enters at the side of annular channel 463 and exits at the top of the annular channel 463 through check valve channel 465. It then flows through check valve 467, down through groove 469, through opening 439, and out through spray tip 410.

Adhesive 400 will fill groove 469. A check valve 467 is placed in check valve channel 465 to prevent adhesive 400 from being pushed into any other channels or chambers. The presence of check valve 467 adjacent to spray tip 410 minimizes the amount of aerosol composition required to displace the adhesive 400.

The design allows the aerosol composition 500 to be injected along the side of the gun. The direction of flow is changed so that the check valve can be placed above the needle helping to evacuate latent adhesive behind the fluid tip.

The design also allows for easy assembly of the sprayer. By including annular channel 463, channel 460 and check valve channel 465 do not have to line up during assembly. As shown in FIGS. 12 and 13, channel 460 is in the inlet body 421, while the check valve channel 465 is in check valve body 423. Without the annular channel 463, simply tightening the assembly too much or not enough could cause misalignment of channel 460 and check valve channel 465, preventing or restricting flow of the aerosol composition. If desired, there can be a gasket 427 between inlet body 421 and check valve body 423. The gasket 427 has a center hole to allow the flow of adhesive 400 and a series of smaller holes around the circumference to allow flow of the aerosol composition 500 through the annular channel 463. Gasket 427 prevents adhesive 400 and aerosol composition 500 from flowing out of their designated paths.

Trigger 470 is journaled to pivot about pivot point 475 on body 480 of sprayer 200. Trigger 470 includes boss 485 at a central upward location thereon which drives valve drive shaft 490. Valve drive shaft 490 is received within aperture 495 in body 480 and is biased by spring 500 within aperture 495 which urges valve drive shaft 490, in the absence of other forces (such as manual pressure by the user), to the position shown, wherein the adhesive 400 is blocked from flowing by slider 435. Valve drive shaft 490 is connected to shaft 440 so that shaft 440 moves in concert with valve drive shaft 490.

When trigger 470 is depressed, shaft 440 withdraws slider 435 from seat 445 and needle 437 from opening 439, opening adhesive chamber outlet 430. Adhesive 400 flows through adhesive chamber 420, around slider 435 and needle 437 and out through sprayer tip 410. When the trigger is released, slider 435 moves forward to seat against seat 445 and needle 437 enters opening 439, closing adhesive chamber outlet 430.

With the adhesive chamber outlet 430 closed, the valve 515 of a container 510 of aerosol composition is contacted with needle valve 455. Needle valve 455 opens, allowing the aerosol composition 500 to flow through needle valve 455, into chamber 460, through annular channel 463, check valve channel 465, check valve 467, groove 469, and out through sprayer tip 410. Aerosol composition 500, such as a aerosol composition, cleans and wets everything it comes into contact with. Aerosol composition 500 can be under pressure, which allows the check valve 470 to open and remain open until the needle valve 455 is disengaged from the aerosol composition container 510.

The aerosol composition is not limited to use with the spray gun description. Any suitable spray gun could be used. Other examples of spray guns in which the aerosol composition of the present invention could be used include those disclosed in application Ser. No. 10/643,107 (ITW 0003 PA), filed Aug. 18, 2003, now U.S. Pat. No. 6,905,084 (which claimed the benefit of Ser. No. 60/453,691, filed Aug. 22, 2002), and which is hereby incorporated by reference.

The aerosol composition need not be used in conjunction with a spray gun as described above. Rather, the aerosol composition could be applied from an aerosol dispenser to a portion of a surface to mask it before applying an adhesive. The presence of the aerosol composition would help prevent the adhesive from adhering to the surface in the masked area.

The following examples are illustrative only and are not intended to limit the invention.

EXAMPLE 1

Aerosol compositions were prepared having the following proportions:

| Component (weight %) | A1 | A2 |
|---|---|---|
| Base Material | 12.5 | 12.5 |
| Solvent - naphtha | 37.5 | |
| Solvent - cycloparaffin | | 37.5 |
| Propellant | 50 | 50 |
| | 100 | 100 |

EXAMPLE 2

Aerosol compositions can be prepared having the following components:

| Components (weight %) | A | B | C | D | E | F | G |
|---|---|---|---|---|---|---|---|
| Petroleum based oil | 5 | 10 | 15 | 10 | 15 | 5 | 10 |
| Solvent - cycloparaffin | 45 | 40 | 35 | 55 | 50 | 35 | 30 |
| Propellant | 50 | 50 | 50 | 35 | 35 | 60 | 60 |

Aerosol compositions A1 and A2 were shown to clear the tip of the spray gun for an indefinite period. These results were achieved by discharging the aerosol composition into the fluid passages of the gun (i.e., chamber 16 and tip 12) after the adhesive had been dispensed. Tests have shown that the aerosol composition not only discharged all latent adhesive behind the tip, but also prevented the adhesive from drying and building up on the tip which could have led to clogging.

When the spray gun was not treated with the aerosol composition after discharging the adhesive, the gun tip was observed to clog in as little as five minutes.

FIG. 1 shows one embodiment of the airless application system 10 of the present invention. The airless application system 10 includes a primary product container 100 connected to a sprayer 200. The primary product container 100 and the sprayer 200 are shown in more detail in FIGS. 2, and 4 and 12, respectively.

Figure 2:
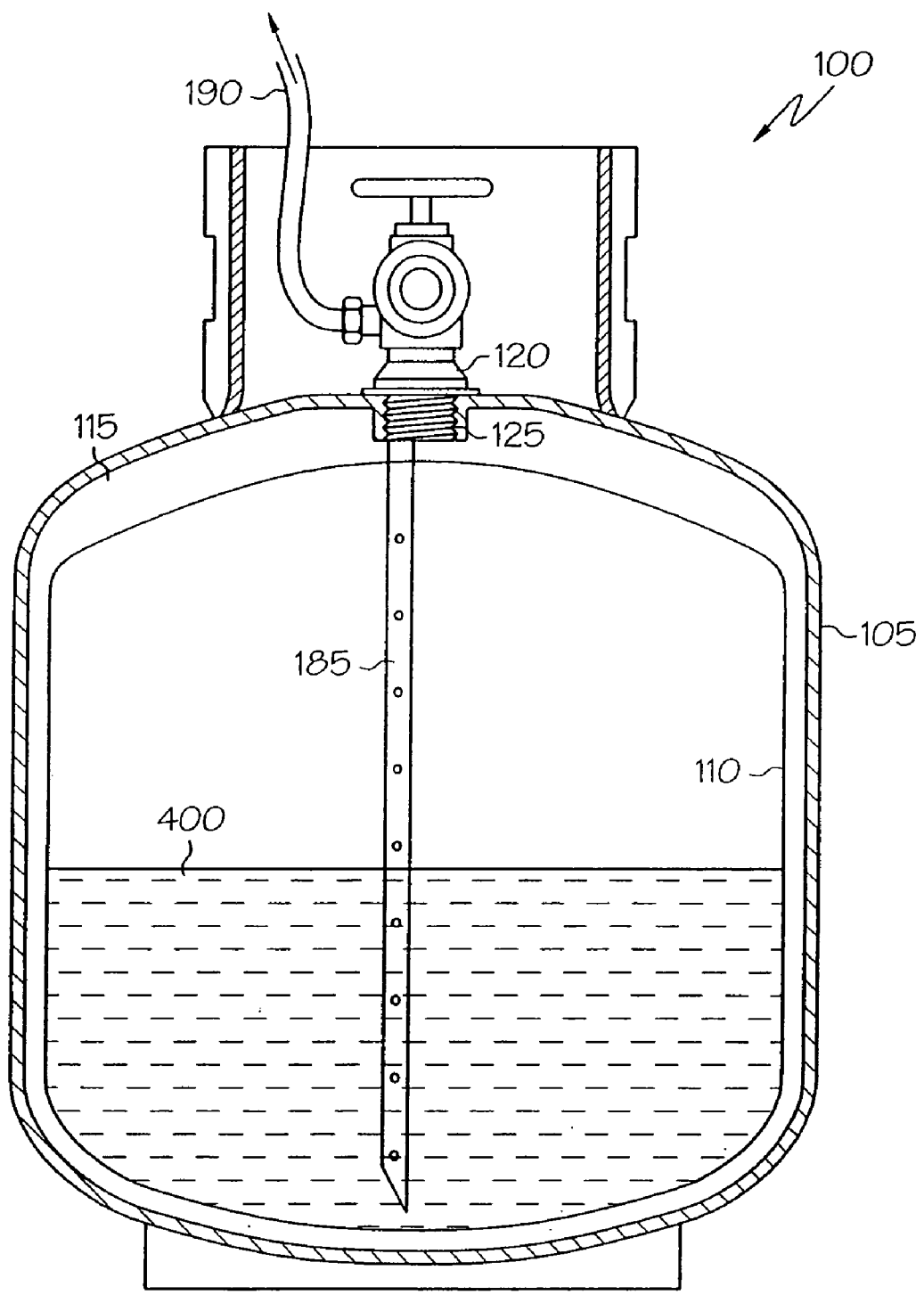
FIG. 2 is a cross-sectional view of one embodiment of a primary product container of the present invention.

As shown in FIG. 2, a suitable primary product container is a bag-in-can type, although other arrangements could be used, if desired. The primary product container 100 is designed to separate the primary product from the propellant, as disclosed more fully in application Ser. No. 10/226,023 (ITW 0004PA), filed Aug. 22, 2002, (now U.S. Pat. No. 6,848,599) and which is hereby incorporated by reference. The primary product container of the present invention is designed to separate the primary product from the propellant while providing a pressurized container to deliver the primary product. The bag-in-can concept is designed to use the propellant to squeeze the primary product out of the bag without mixing the propellant and the primary product.

As shown in FIG. 2, the primary product container 100 includes a relatively rigid canister 105. By "relatively rigid," we mean a material which is capable of containing sufficient pressure for the application. The canister 105 can be made of any material suitable for transporting pressurized products. For example, the canister 105 could be a steel or other metal cylinder, such as those designed for propane or refrigerant containment or a similar application. Alternatively, canisters made of plastics, including, but not limited to polyethylene terephthalate (PET), could be used in some applications. The canister should be able to withstand internal pressures of up to 500 psig or more, depending on the application.

Primary product 400 is contained within collapsible bag 110 positioned within canister 105. Bag 110 can be made of any material suitable for the separation and containment of primary product 400, including, but not limited to, plastics, such as polyethylene, polypropylene, and multilayer films, such as a polyethylene/nylon film, and metals, such as aluminum foils, and metallized films. The bag can be formed by welding two sheets of material together at the edges. Other methods of forming the bag could also be used, if desired. Typically, bag 110 is slightly oversized and shaped to conform to the inside of the canister 105.

Primary product 400 can be a material including, but not limited to, an adhesive. Generally, the adhesive is of a type which will flow at ambient temperature. Adhesives which flow at higher temperatures could also be used under appropriate high temperature conditions. The adhesive is generally a water-based adhesive, although solvent-based adhesives could also be used. Suitable adhesives include, but are not limited to contact adhesives and pressure sensitive adhesives.

Propellant 115 is charged between canister 105 and bag 110. Propellant 115 provides the differential pressure to drive primary product 400 out of bag 110 when the appropriate valves have been opened. Propellant 115 can be liquefied gases, compressed gases, or a combination, depending on the pressures desired and any regulations which might be involved. Suitable propellants include, but are not limited to, flammable and non-flammable liquefied or compressed gases. The propellant is generally charged to a pressure in the range of about 20 to about 500 psig, typically about 50 to about 200 psig, more typically about 80 to about 120 psig.

Figure 3:
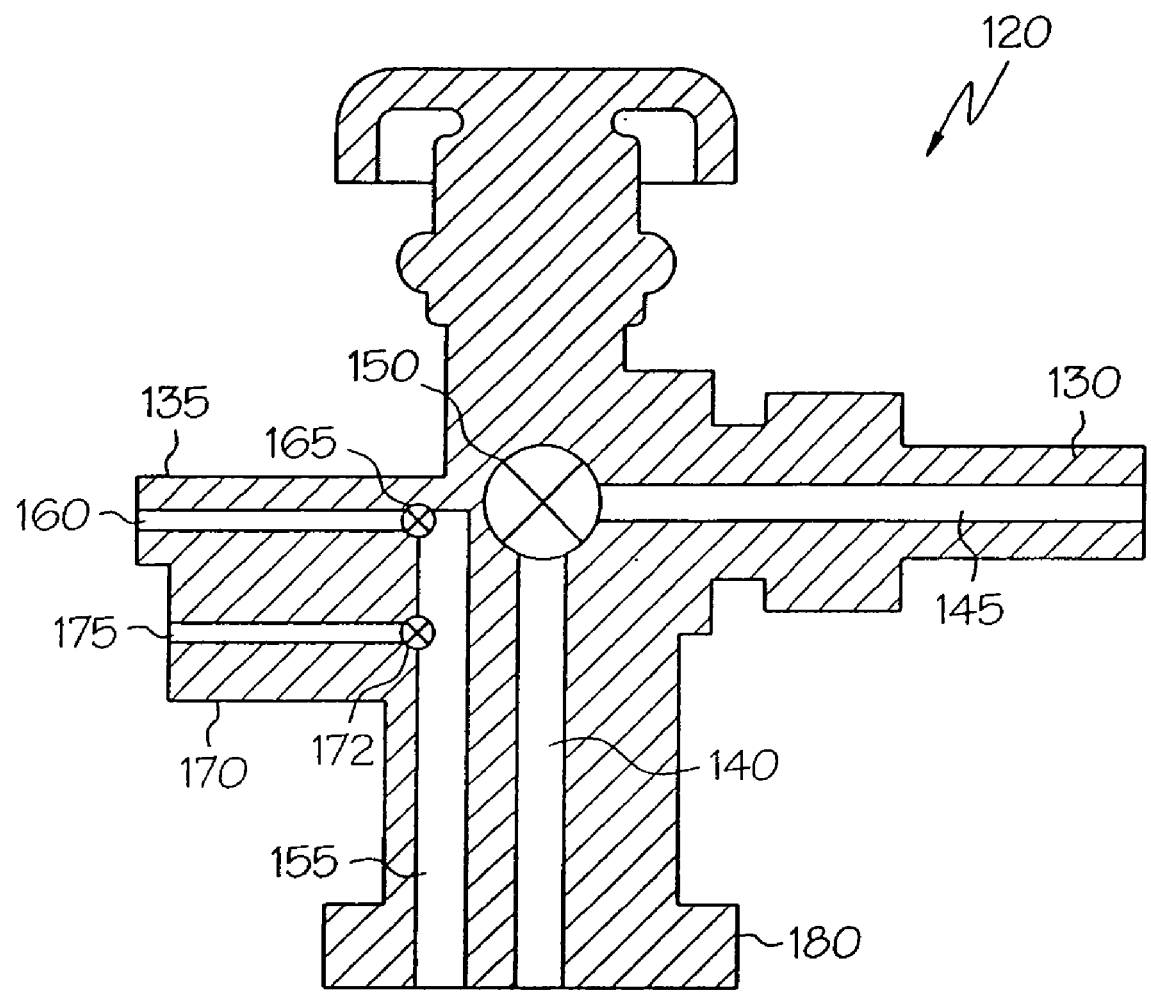
FIG. 3 is a cross-sectional view of one embodiment of the valve of the present invention.

A cylinder valve 120 is threaded onto a receiving port 125 of canister 105. As shown in FIG. 3, cylinder valve 120 has a primary product port 130 and a propellant port 135. The primary product port 130 can include a vertical primary product channel 140 and a horizontal primary product channel 145. A primary product valve 150 controls the opening between the vertical primary product channel 140 and the horizontal primary product channel 145. One example of a valve which can be used for primary product valve 150 includes an actuator which raises and lowers a plug between the vertical and horizontal primary product channels 140, 145. The bag 110 is filled with primary product 400 through the primary product port 130. Primary product valve 150 is opened, allowing flow between the horizontal primary product channel 145 and the vertical primary product channel 140. Primary product 400 flows through horizontal primary product channel 145 and vertical primary product channel 140 into bag 110.

The propellant port 135 can include a vertical propellant channel 155 and a horizontal propellant channel 160. There is a propellant valve 165 which controls the opening between the vertical propellant channel 155 and the horizontal propellant channel 160. One example of a suitable valve for propellant valve 165 is a spring-type valve, such as a Schrader valve. The space between the outside of the bag 110 and the inside of the canister 105 is filled with propellant 115 through the propellant port 135. If a Schrader valve is used, a needle in the clamp mechanism actuates the Schrader valve allowing the propellant to flow into the space between the outside of the bag 110 and the inside of the canister 105. Propellant can emptied from the space using the same valve.

The cylinder valve 120 can also include a pressure relief port 170. Pressure relief channel 175 is connected to vertical propellant channel 155 by pressure relief valve 172. One example of a suitable valve for pressure relief valve 172 is a spring-operated valve. The pressure relief valve 172 can have a pre-set pressure which will activate it.

Suitable valves for the primary product valve, the propellant valve, and the pressure relief valve are well known to those of skill in the art.

Cylinder valve 120 can incorporate a quick-release air fitting 180 to allow for easy installation and removal of bags 110. The primary product port 130 can have any suitable type of fitting, such as a National Pipe Swivel Mechanical (NPSM) fitting, so that it can be attached to an appropriate hose for connection to a sprayer.

Perforated tube 185 can be sealed or molded into bag 110 to act as a siphon for primary product 400. Perforated tube 185 can be integrated into one of the seams of bag 110, if desired. Perforated tube 185 allows unrestricted access to the top of the canister 105. Perforated tube 185 provides a path for primary product 400 to pass from bag 110 through the primary product port 130 of cylinder valve 120, through hose 190 and into primary product inlet 425 (see FIGS. 1 and 12). When the appropriate valves are opened, a differential pressure higher than atmospheric pressure allows the primary product 400 to exit the bag 110. As the bag 110 collapses, the propellant 115 expands to fill the area left vacant by the primary product 400.

The procedure for filling the primary product container involves introducing the primary product into the bag through the primary product port. The propellant port can be put under vacuum while the primary product is filled, if desired. After the bag has been filled with the desired amount of primary product, the primary product port can be cleaned to ensure that the primary product valve is free of primary product and closed. The propellant is filled through the propellant port, which is then closed. The primary product container is then ready for use. To ensure that the primary product container contains the appropriate amount of primary product and propellant, the filling can be done automatically using preset primary product and propellant weight set points. The entire fill process can be automated, if desired.

The primary product container can be reused after the primary product has been dispensed. The bag will likely need to be replaced, although it could also be reused in some situations, if desired. After the bag is placed in the canister and connected to the valve, primary product and propellant could then be charged into the primary product container as discussed above, and it would be ready for reuse.

Alternatively, the primary product and the propellant could be reversed in the container. In this arrangement, the propellant is contained in the collapsible bag while the primary product is in the space between the outside of the collapsible bag and the inside of the relatively rigid canister. The propellant would expand inside the bag, forcing the primary product out of the container. The bag would be designed to withstand the pressures involved. The valve has a primary product port in selective communication with the space between the outside of the collapsible bag and the inside of the relatively rigid canister and a propellant port in selective communication with the collapsible bag. The perforated tube would be placed into the space between the outside of the collapsible bag and the inside of the relatively rigid canister to allow flow of the primary product out of the space. The pressure relief valve would be in selective communication with the collapsible bag.

When the relatively rigid canister is made of plastic in this alternate arrangement, the use of a water-based primary product would not rust the canister.

FIG. 4 is a cross-sectional view of one embodiment of a sprayer 200 which can be used in the present invention. Sprayer 200 includes sprayer tip 210 with aperture 215 therethrough for spraying or dispensing primary product 400, such as an adhesive or other product, and for spraying or dispensing secondary product 500, such as a cleaner or other product, such as the aerosol solution described herein. The interior of sprayer tip 210 further includes chamber 220 which receives the primary product 400 and secondary product 500 to be dispensed or sprayed (see FIGS. 5–11). Chamber 220 receives the primary product 400 through primary product chamber outlet 225 which is selectively opened or closed by primary slider 230, shaft 235, and spring 267. Shaft 235 slides through the middle of primary slider 230, and primary slider 230 reciprocates within primary product chamber 240. Primary product chamber 240 receives the primary product 400, such as an adhesive or other material to be dispensed or sprayed, via passageway 250 which communicates with primary product inlet 255. Primary product inlet 255 is fastened to hose 135 of the primary product container 100 by a fastener and thereby receives primary product 400 from the primary product container 100.

When shaft 235 is in the forward position shown in FIG. 5, spring 267 biases primary slider 230 to seat against primary seat 260, closing primary product chamber outlet 225. Primary product 400 is blocked from flowing into chamber 220 and is not dispensed from sprayer tip 210. When the reciprocation of the primary slider 230 opens primary product chamber outlet 225, primary slider 230 is withdrawn from primary seat 260 and shaft 235 is partially withdrawn from chamber 220 (see FIGS. 7–9). Primary product 400 flows around primary slider 230 through primary product chamber outlet 225 into chamber 220 and is dispensed through sprayer tip 210.

Chamber 220 is also in communication with passageway 265 and channel 270. Channel 270 is in communication with lateral channel 275 which is in communication with secondary lateral chamber 280. Secondary lateral chamber 280 is in selective communication with secondary product chamber 285. Secondary slider 290 reciprocates within secondary lateral chamber 280 controlling secondary product chamber outlet 295. When secondary product chamber outlet 295 is closed (see FIGS. 6–10), secondary slider 290 is seated against secondary seat 300.

Shaft 235 slides through the middle of secondary slider 290. Spring 297 biases secondary slider 290 toward secondary seat 300. However, when shaft 235 is in the position shown in FIGS. 4 and 5, secondary slider ring 299 restrains secondary slider 290 from seating against secondary seat 300, and secondary product chamber outlet 295 remains open.

Secondary product chamber 285 includes tertiary chamber 305. Tertiary slider 310 reciprocates within tertiary chamber 305 controlling secondary product chamber inlet 315. When secondary product chamber inlet 315 is closed, tertiary slider 310 is seated against tertiary seat 320. Tertiary chamber 305 is in communication with pipe 325 via tertiary port 330. Tertiary port 330 receives secondary product 500 (for example, an aerosol-type cleaning solution) via pipe 325 which is in communication with chamber 335 in handle 340. Chamber 335 includes aperture 345 which is in communication with secondary product container 350 containing secondary product 500. Secondary product container 350 is contained within handle 340.

Shaft 235 slides through the middle of tertiary slider 310. Spring 355 in tertiary chamber 305 biases tertiary slider 310 to seat against tertiary seat 320, closing the secondary product chamber inlet 315.

Primary slider ring 269, secondary slider ring 299, and tertiary slider ring 359 are secured to shaft 235 so that they do not move relative to shaft 235. The movement of shaft 235 with primary, secondary, and tertiary slider rings 269, 299, and 359, in conjunction with the action of primary spring 267, secondary spring 297, and tertiary spring 355, causes primary slider 230, secondary slider 290, and tertiary slider 310 to move.

Trigger 360 is journaled to pivot about pivot point 365 on body 370 of sprayer 200. Trigger 360 includes boss 375 at a central upward location thereon which drives valve drive shaft 380. Valve drive shaft 380 is received within aperture 385 in body 370 and is biased by spring 390 within aperture 385 which urges valve drive shaft 380, in the absence of other forces (such as manual pressure by the user), to the position shown in FIGS. 4 and 5, wherein the primary product 400 is blocked from flowing by primary slider 230 and secondary product 500 is blocked from entering secondary product chamber 285 by tertiary slider 310.

Valve drive shaft 380 is connected to shaft 235 so that shaft 235 moves in concert with valve drive shaft 380.

Figure 4:
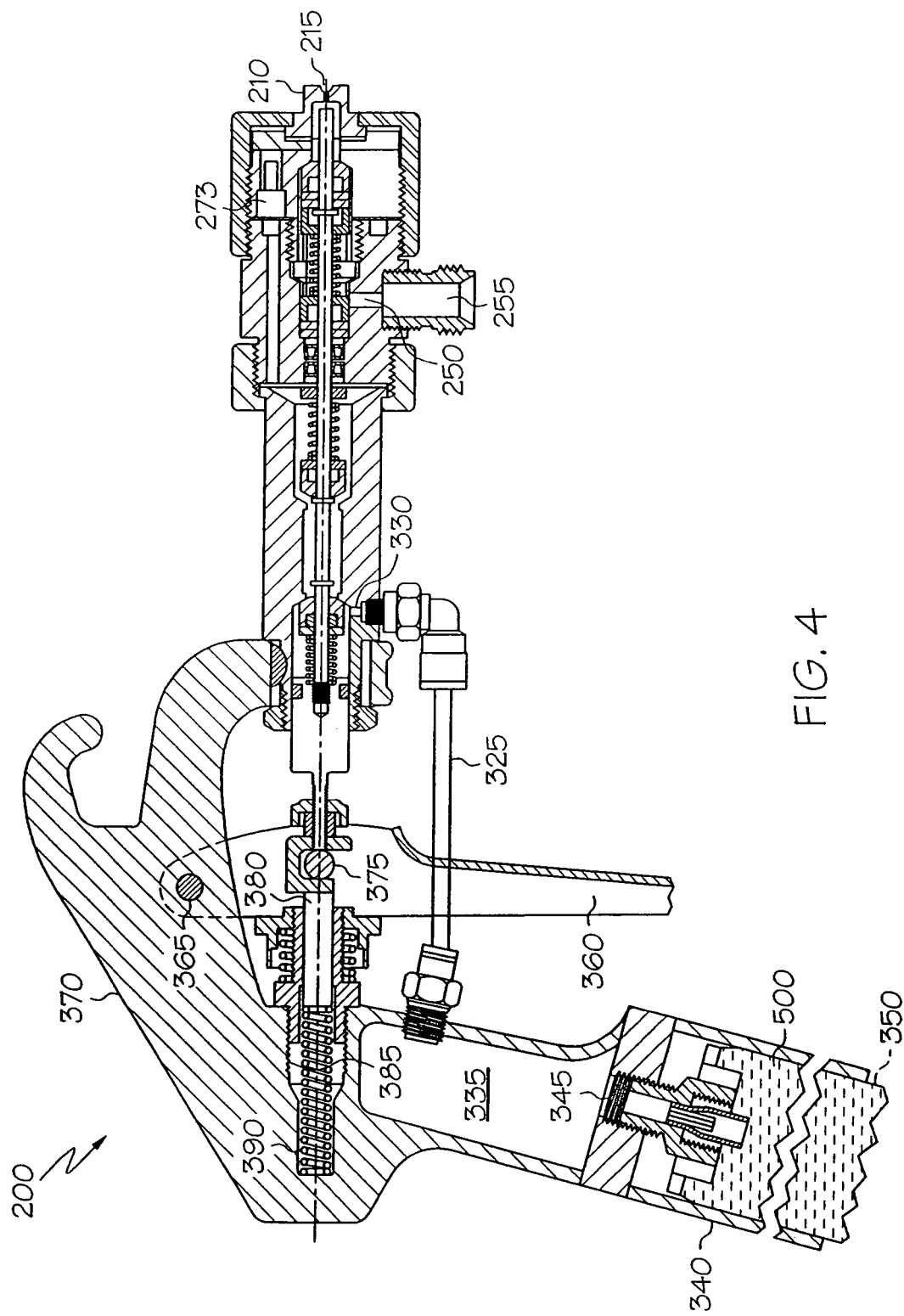
FIG. 4 is a cross-sectional side view, partially in phantom, of one embodiment of a spray gun of the present invention, shown at rest with the trigger not depressed.
Figure 5:
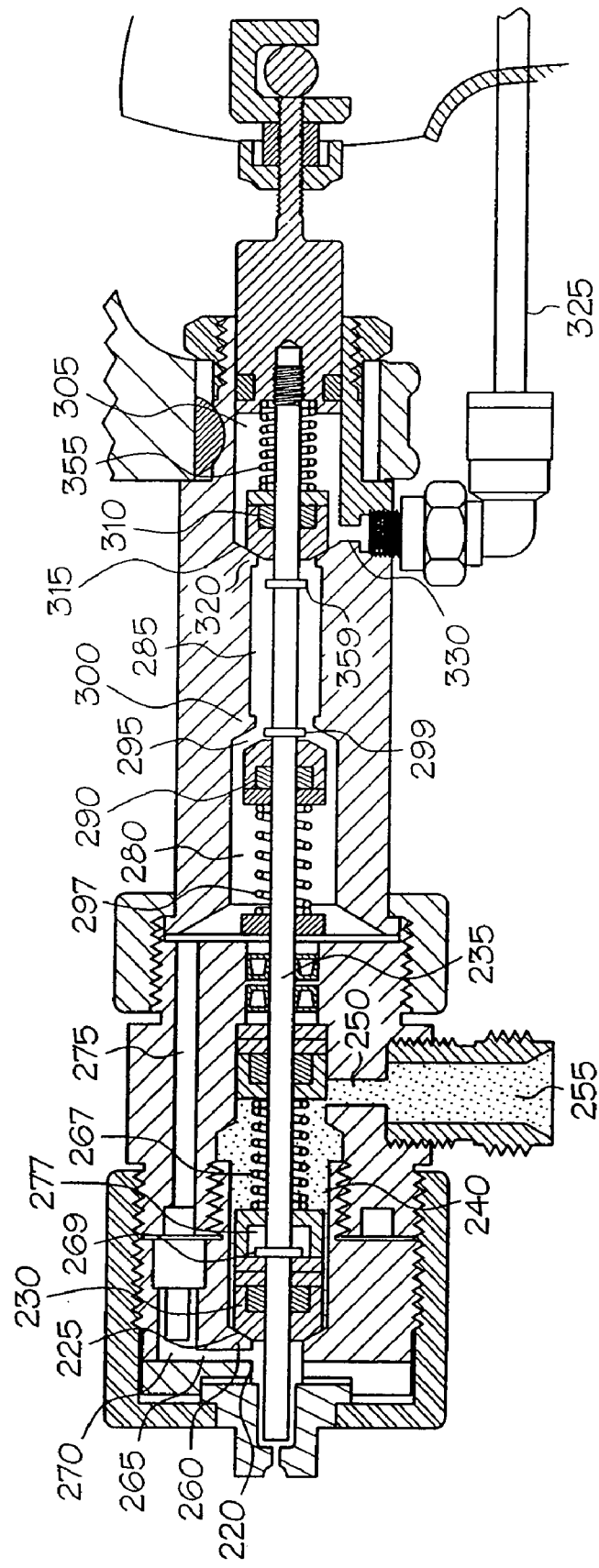
FIG. 5 is a cross-sectional side view of the valve assembly of one embodiment of a spray gun of the present invention, shown at rest with the trigger not depressed.
Figure 6:
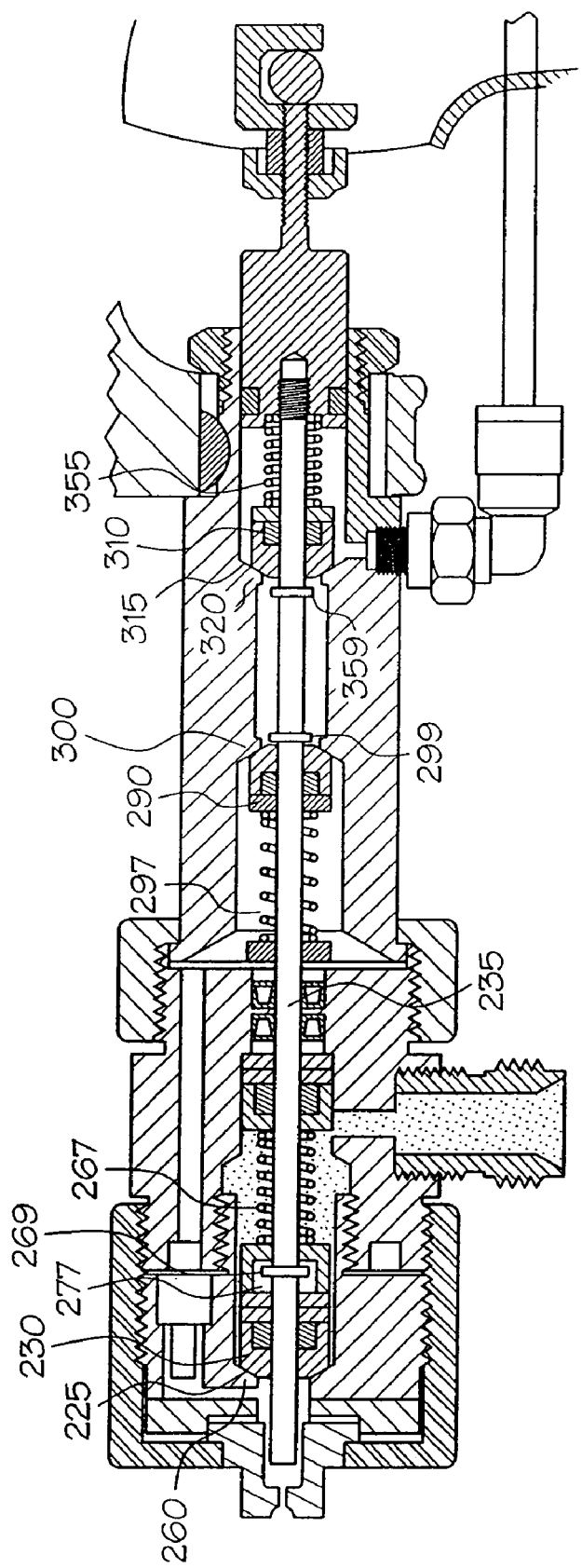
FIG. 6 is a cross-sectional side view of the valve assembly of one embodiment of a spray gun of the present invention, shown with the trigger partially depressed.

Therefore, when trigger 360 is slightly depressed (such as would happen when the user initially depresses trigger 360 but has not yet fully depressed it), shaft 235 moves from the position shown in FIGS. 4 and 5 in which primary product chamber outlet 225 and secondary product chamber inlet 315 are closed and secondary product chamber outlet 295 is open, to the position shown in FIG. 6. Primary slider 230 contains a cavity 277 in which primary slider ring 269 can move. Although shaft 235 has moved backward, primary slider 230 remains seated against primary seat 260 because primary slider ring 269 has not reached the back of cavity 277. Therefore, primary product chamber outlet 225 remains closed. Secondary product chamber inlet 315 remains closed because tertiary slider 310 is seated against tertiary seat 320. As shaft 235 moves backward, secondary slider ring 299 moves backward, allowing the bias of spring 297 to force secondary slider 290 against secondary seat 300 and closing secondary product chamber outlet 295.

Figure 7:
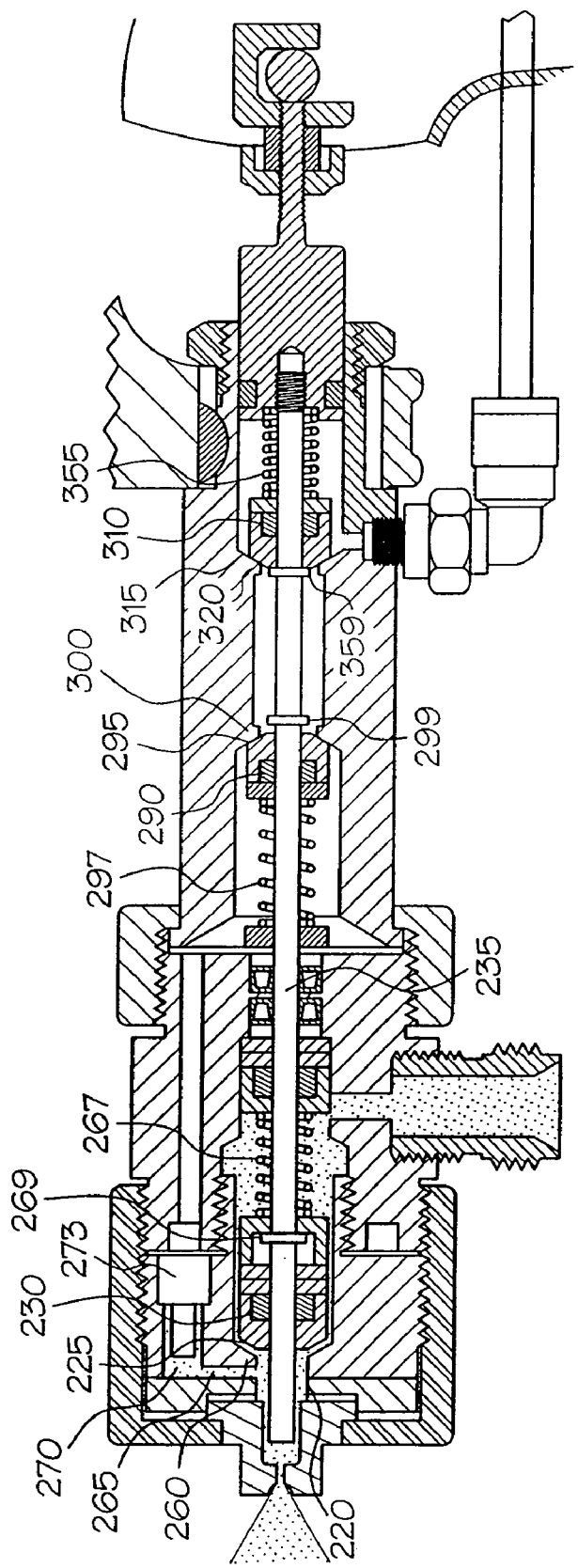
FIG. 7 is a cross-sectional side view of the valve assembly of one embodiment of a spray gun of the present invention, shown with the trigger further partially depressed.

As trigger 360 is depressed further, shaft 235 moves to the position shown in FIG. 7. Secondary product chamber outlet 295 remains closed because secondary slider 290 is seated against secondary seat 300. Secondary product chamber inlet 315 remains closed because tertiary slider 310 is seated against tertiary seat 320. The movement of shaft 235 forces primary slider ring 269 against the back of cavity 277 in primary slider 230, causing primary slider 230 to move away from seat 260 and opening primary product chamber outlet 225. Primary product 400 flows around primary slider 230, into chamber 200, around shaft 235, and out through sprayer tip 210.

Primary product 400 also fills passageway 265 and channel 270. A check valve 273 is placed in channel 270 to prevent primary product 400 from being pushed into any other channels or chambers. The presence of check valve 273 adjacent to spray tip 210 minimizes the amount of secondary product, such as a cleaning solution, required to displace the primary product 400.

Figure 8:
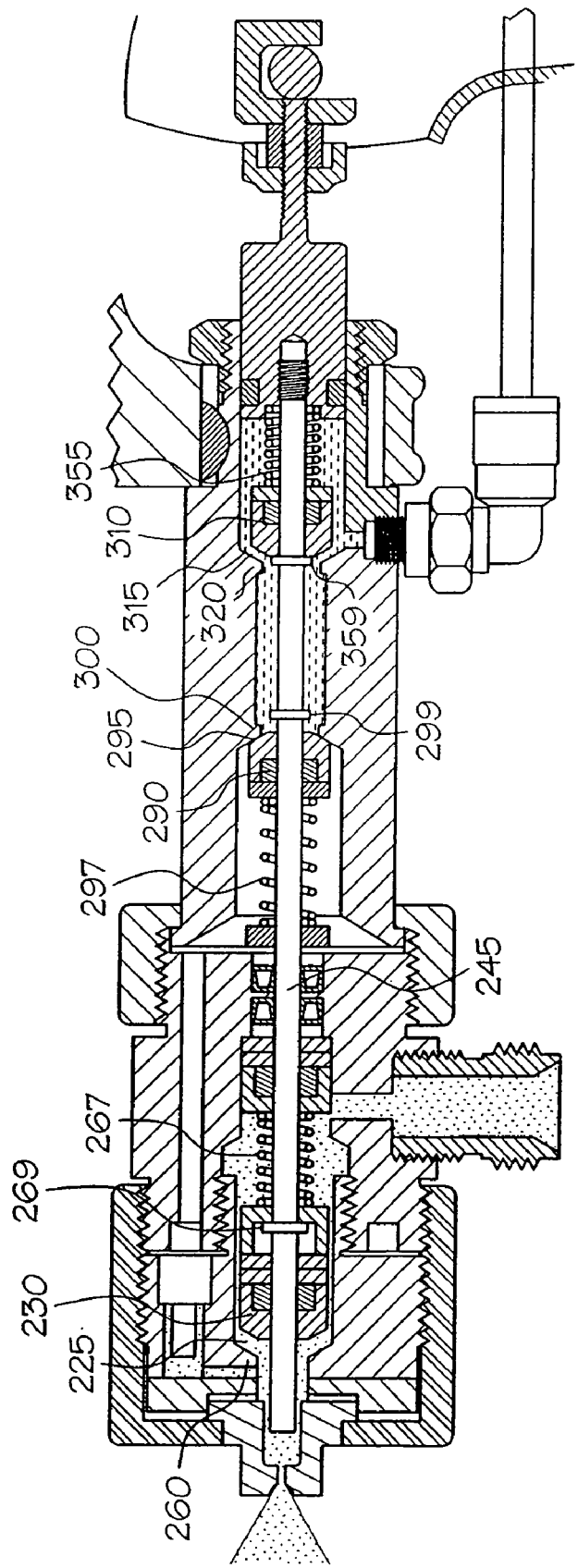
FIG. 8 is a cross-sectional side view of the valve assembly of one embodiment of a spray gun of the present invention, shown with the trigger fully depressed.

Trigger 360 is depressed further until it reaches the fully depressed position shown on FIG. 8. The shaft 235 has moved to the fully retracted position. Primary product chamber outlet 225 remains open because primary slider 230 is not seated against primary seat 260, and primary product 400 continues to flow from sprayer tip 210. Secondary product chamber outlet 295 remains closed because secondary slider 290 is seated against seat 300. Tertiary slider ring 359 forces tertiary slider 310 away from tertiary seat 320, opening secondary product chamber inlet 315. Secondary product 500 flows into secondary product chamber 285 and fills it because secondary product chamber outlet 295 is closed.

Figure 9:
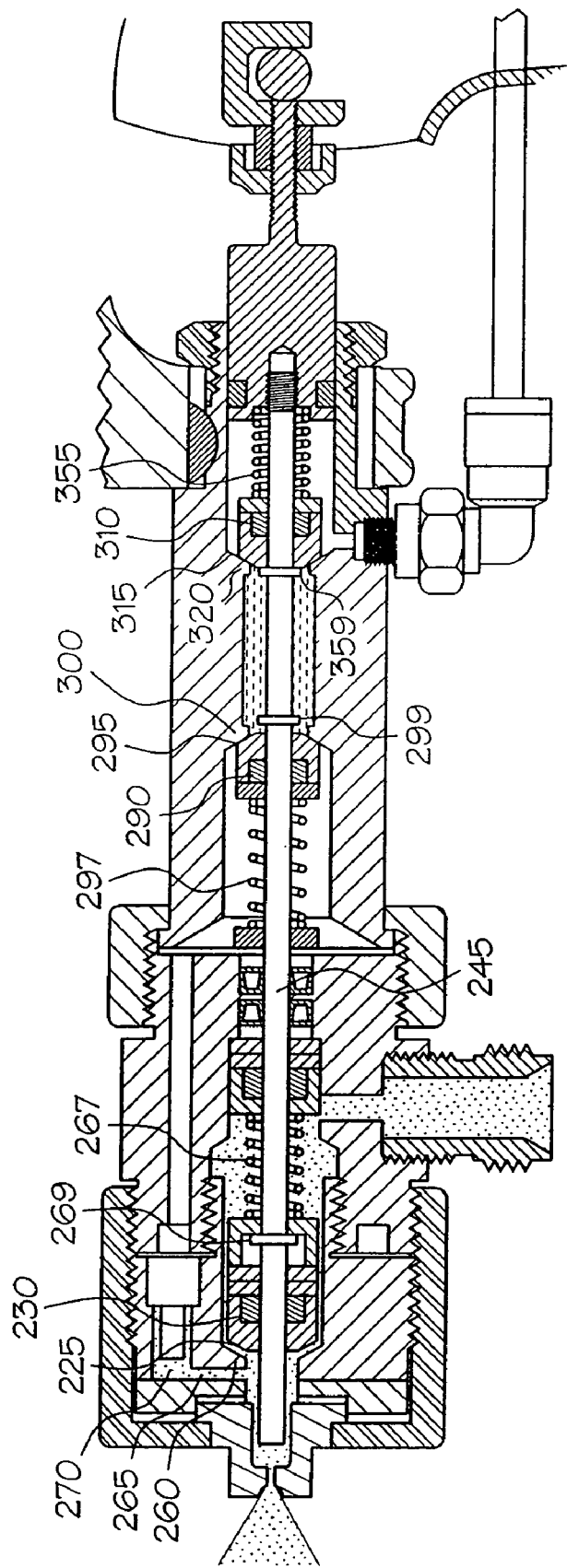
FIG. 9 is a cross-sectional side view of the valve assembly of one embodiment of a spray gun of the present invention, shown with the trigger partially released.

When the user is finished applying primary product 400, trigger 360 is released and shaft 235 moves forward to the position shown in FIG. 9. Primary product 400 is still flowing through the open primary product chamber outlet 225 to sprayer tip 210. Secondary product chamber outlet 295 remains closed. Tertiary slider ring 359 has moved forward sufficiently so that tertiary spring 355 forces tertiary slider 310 against tertiary seat 320, closing secondary product chamber inlet 315. With both secondary product chamber outlet 295 and secondary product chamber inlet 315 closed, secondary product chamber 285 contains a metered amount of secondary product 500.

Figure 10:
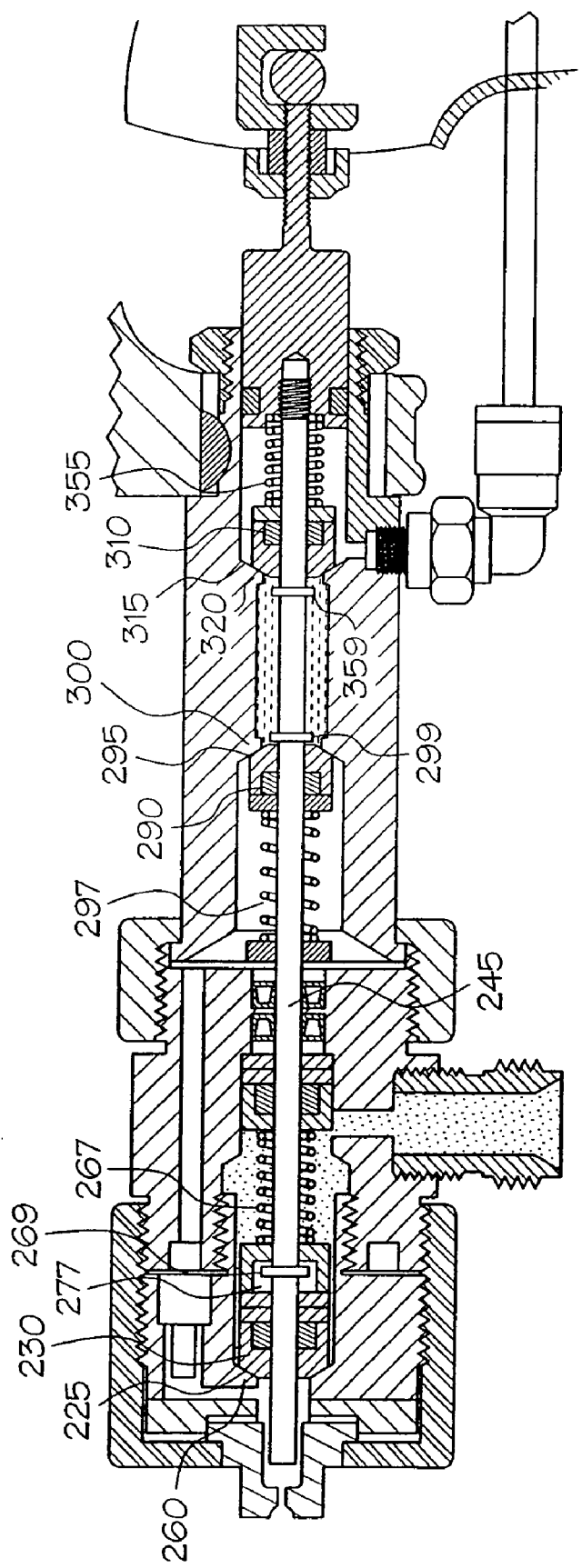
FIG. 10 is a cross-sectional side view of the valve assembly of one embodiment of a spray gun of the present invention, shown with the trigger further partially released.

As trigger 360 is released further, shaft 235 moves forward to the position shown in FIG. 10. Both secondary product chamber outlet 295 and secondary product chamber inlet 315 remain closed, and secondary product chamber 285 remains filled with secondary product 500. Primary slider ring 269 has moved forward in cavity 277 sufficiently that primary spring 267 forces primary slider 230 against primary seat 260, closing primary product chamber outlet 225 and stopping the flow of primary product 400.

Figure 11:
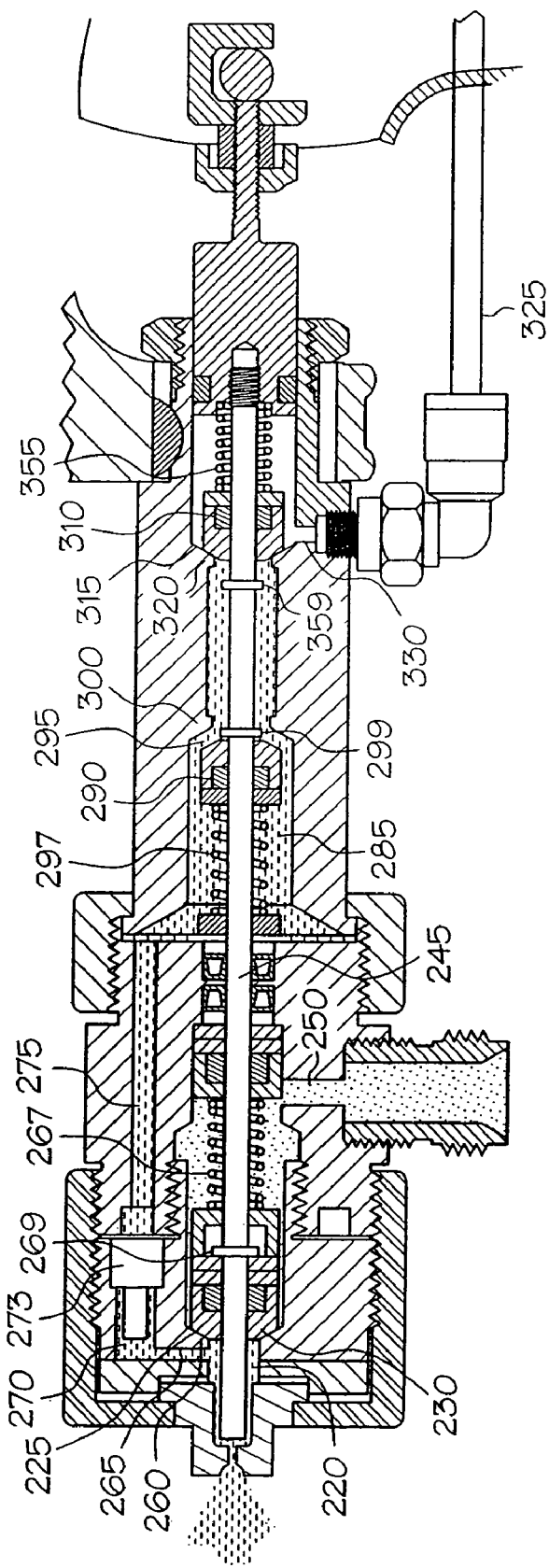
FIG. 11 is a cross-sectional side view of the valve assembly of one embodiment of a spray gun of the present invention, shown with the trigger further partially released.

As trigger 360 is released further, shaft 235 moves to the position in FIG. 11. Primary product chamber outlet 225 and secondary product chamber inlet 315 remain closed. Secondary slider ring 299 has moved forward so that it forces secondary slider 290 against secondary spring 297 and away from secondary seat 300, opening secondary product chamber outlet 295 and releasing the metered amount of secondary product 500 from secondary product chamber 285. Secondary product 500 flows through secondary lateral chamber 280 and lateral channel 275. It then flows through check valve 273, channel 270, passageway 265, channel 220, around shaft 235, and out through spray tip 210. If secondary product 500 is a cleaning solution, it will clean channel 270, passageway 265, channel 220, the exposed part of shaft 235, and spray tip 210, and help prevent the build-up of primary product 400, such as an adhesive.

An alternate embodiment of a sprayer 200 is shown in FIG. 12. Sprayer 200 includes sprayer tip 410 with aperture 415 therethrough for spraying or dispensing primary product 400 and secondary product 500. The sprayer 200 further includes primary product chamber 420. Primary product chamber 420 receives the primary product 400 from primary product inlet 425. Primary product inlet 425 would be connected to the primary product container 100. Primary product chamber outlet 430 is selectively opened and closed by slider 435 and shaft 440. Slider 435 includes needle 437. Shaft 440 is attached to slider 435, and slider 435 reciprocates within primary product chamber 420. When shaft 440 is in the forward position shown in FIG. 12, needle 437 is inserted into opening 439 and slider 435 seats against seat 445, closing primary product chamber outlet 430. Primary product 400 is blocked from flowing and is not dispensed from sprayer tip 410. When the reciprocation of slider 435 opens primary product chamber outlet 430, slider 435 is withdrawn from seat 445 and needle 437 is withdrawn from opening 439. Primary product 400 flows around slider 435 and needle 439 and is dispensed from sprayer tip 410.

Secondary product 500 is introduced through secondary product chamber outlet 450. Secondary product chamber outlet 450 is selectively opened and closed by needle valve 455. When needle valve 455 is closed as shown in FIG. 13, secondary product 500 cannot flow through secondary product chamber outlet 450. When needle valve 455 is opened by inserting it into a valve on the top of an aerosol can (not shown) of secondary product, secondary product 500 flows through needle valve 455, channel 460, and into annular channel 463. Secondary product 500 enters at the side of annular channel 463 and exits at the top of the annular channel 463 through check valve channel 465. It then flows through check valve 467, down through groove 469, through opening 439, and out through spray tip 410.

The design allows the secondary product 500 to be injected along the side of the gun. The direction of flow is changed so that the check valve can be placed above the needle helping to evacuate latent adhesive behind the fluid tip.

The design also allows for easy assembly. By including annular channel 463, channel 460 and check valve channel 465 do not have to line up during assembly. As shown in FIGS. 12 and 13, channel 460 is in the inlet body 421, while the check valve channel 465 is in check valve body 423. Without the annular channel 463, simply tightening the assembly too much or not enough could cause misalignment of channel 460 and check valve channel 465, preventing or restricting flow of the secondary product. If desired, there can be a gasket 427 between inlet body 421 and check valve body 423. The gasket 427 has a center hole to allow the flow of primary product 400 and a series of smaller holes around the circumference to allow flow of the secondary product 500 through the annular channel 463. Gasket 427 prevents primary product 400 and secondary product 500 from flowing out of their designated paths.

Trigger 470 is journaled to pivot about pivot point 475 on body 480 of sprayer 200. Trigger 470 includes boss 485 at a central upward location thereon which drives valve drive shaft 490. Valve drive shaft 490 is received within aperture 495 in body 480 and is biased by spring 497 within aperture 495 which urges valve drive shaft 490, in the absence of other forces (such as manual pressure by the user), to the position shown, wherein the primary product 400 is blocked from flowing by slider 435. Valve drive shaft 490 is connected to shaft 440 so that shaft 440 moves in concert with valve drive shaft 490.

When trigger 470 is depressed toward handle 498, shaft 440 withdraws slider 435 from seat 445 and needle 437 from opening 439, opening primary product chamber outlet 430. Primary product 400 flows through primary product chamber 420, around slider 435 and needle 437 and out through sprayer tip 410. When the trigger is released, slider 435 moves forward to seat against seat 445 and needle 437 enters opening 439, closing primary product chamber outlet 430.

With the primary product chamber outlet 430 closed, the valve 515 of a container 510 of secondary product (not shown) is contacted with needle valve 455. Needle valve 455 opens, allowing the secondary product 500 to flow through needle valve 455, into chamber 460, through annular channel 463, check valve channel 465, check valve 467, groove 469, and out through sprayer tip 410. Secondary product 500, such as a cleaning solution, cleans and wets everything it comes into contact with. Secondary product 500 can be under pressure, which allows the check valve 470 to open and remain open until the needle valve 455 is disengaged from the secondary product container 510.

Alternatively, a secondary product chamber could be connected to the secondary product chamber outlet with a valve used to control the secondary product chamber outlet.

The sprayer may optionally include a trigger guard 499 to prevent the sprayer from being activated accidentally.

Thus, the present invention provides a portable, self-contained supply of primary and secondary product. It allows an automatic tip-cleaning function if a cleaning solution is used as the secondary solution. The system is scalable, and mobility is only limited by the weight of the product and package. In addition, it can be used with a great range of products without the addition of ingredients that are environmentally or user unfriendly (volatile organic compounds, flammable, etc.).

While certain representative embodiments and details have been shown for purposes of illustrating the invention, it will be apparent to those skilled in the art that various changes in the compositions and methods disclosed herein may be made without departing from the scope of the invention, which is defined in the appended claims.

We claim:

1. An airless application system comprising:
 a primary product container;
 a secondary product container; and
 a sprayer in fluid communication with the primary product container, the sprayer in fluid communication with the secondary product container, the sprayer comprising:
  an inlet body;
  a check valve body;
  an annular channel between the inlet body and the check valve body;
  a sprayer tip;
  a primary product chamber for holding a primary product to be dispensed through the sprayer tip, the primary product chamber in selective fluid communication with the sprayer tip, the primary product chamber having an outlet;
  a manual control which travels through a range, the range including a first position and a second position;
  a valve assembly responsive to the manual control, wherein when the manual control is in the first position, the primary product chamber outlet is closed; and wherein when the manual control is in the second position, the primary product outlet is open; and
  a secondary product valve in selective fluid communication with the sprayer tip, the secondary product valve located in the inlet body;
  a first channel between the secondary product valve and the annular channel; and
  a second channel between the annular channel and the spray tip.

2. The airless application system of claim 1 wherein the secondary product container has an outlet valve, wherein the secondary product valve is in selective fluid communication with the secondary product container outlet valve, wherein when the secondary product valve is in contact with the secondary product container outlet valve, the secondary product valve and the secondary product container outlet valve are open, and wherein when the secondary product valve is not in contact with the secondary product container outlet valve, the secondary product valve and the secondary product container outlet valve are closed.

3. The airless application system of claim 2 wherein the secondary product valve is a needle valve.

4. The airless application system of claim 1 wherein the manual control is a trigger, and wherein a first trigger position is a rest position toward which the trigger is biased, and wherein a second trigger position is a substantially fully depressed position of the trigger.

5. The airless application system of claim 4 further comprising a trigger guard.

6. The airless application system of claim 4 further comprising a handle toward which the trigger moves for the second trigger position.

7. The airless application system of claim 1 wherein the primary product container comprises:

a relatively rigid canister;
a collapsible bag within the relatively rigid canister
a space between the outside of the collapsible bag and the inside of the relatively rigid canister.

8. The airless application system of claim 7 wherein the collapsible bag contains a primary product and the space contains a propellant.

9. The airless application system of claim 7 wherein the collapsible bag contains a propellant and the space contains a primary product.

10. The airless application system of claim 7 further comprising a perforated tube sealed in the collapsible bag.

11. The airless application system of claim 7 wherein the primary product container further comprises a pressure relief valve.

12. The airless application system of claim 8 wherein the propellant is under a pressure of between about 20 and about 500 psig.

13. A method of airless spraying of a primary product and a secondary product comprising:
providing a sprayer tip;
providing a primary product chamber having an outlet, the primary product chamber in selective fluid communication with the sprayer tip;
providing a secondary product valve in selective fluid communication with the sprayer tip, and the secondary product valve in selective fluid communication with a secondary product container outlet valve of a secondary product container;
providing a primary product to the primary product chamber;
opening the primary product chamber outlet and thereby dispensing the primary product, the primary product chamber outlet being opened while the secondary product valve is closed;
closing the primary product outlet;
placing the secondary product container outlet valve in contact with the secondary product valve, opening the secondary product valve and thereby dispensing the secondary product, the secondary product valve being opened after the primary product chamber outlet is closed; and
closing the secondary product valve.

14. The method of claim 13 wherein the secondary product valve comprises a needle valve through which the secondary product flows when the secondary product container outlet valve is in contact with the secondary product valve.

15. A method of airless spraying of a primary product and a secondary product comprising:
providing an airless application system comprising:
a primary product container;
a secondary product container having a secondary product container outlet valve; and
a sprayer in fluid communication with the primary product container, the sprayer in fluid communication with the secondary product container, the sprayer comprising:
an inlet body;
a check valve body;
an annular channel between the inlet body and the check valve body;
a sprayer tip;
a primary product chamber for holding a primary product to be dispensed through the sprayer tip, the primary product chamber in selective fluid communication with the sprayer tip, the primary product chamber having an outlet;
a manual control which travels through a range, the range including a first position and a second position;
a valve assembly responsive to the manual control, wherein when the manual control is in the first position, the primary product chamber outlet is closed; and wherein when the manual control is in the second position, the primary product outlet is open; and
a secondary product valve in selective fluid communication with the sprayer tip, the secondary product valve located in the inlet body;
a first channel between the secondary product valve and the annular channel; and
a second channel between the annular channel and the spray tip,
providing a primary product to the primary product chamber from the primary product container;
moving the manual control from the first position to the second position, thereby opening the primary product chamber outlet;
dispensing the primary product from the sprayer tip;
moving the manual control from the second position to the first position, thereby closing the primary product chamber outlet;
opening the secondary product valve and dispensing the secondary product; and
closing the secondary product valve.

16. The method of claim 15 wherein the secondary product valve comprises a needle valve through which the secondary product flows when the secondary product valve is in contact with the secondary product container outlet valve.

17. The method of claim 15 further comprising providing a check valve adjacent to the sprayer tip.

18. The method of claim 15 wherein the manual control is a trigger, and wherein the first position of the manual control is a rest position toward which the trigger is biased, and wherein the second position of the manual control is a substantially fully depressed position of the trigger.

19. The method of claim 18 further comprising a handle toward which the trigger moves for the second trigger position.

* * * * *